US006959479B2

(12) United States Patent
Yamanaka et al.

(10) Patent No.: US 6,959,479 B2
(45) Date of Patent: Nov. 1, 2005

(54) METHOD OF MANUFACTURING A HOLLOW SHAFT HAVING A FLANGE AT ONE END THEREOF

(75) Inventors: Shigeaki Yamanaka, Hiroshima-ken (JP); Masami Oguri, Tokyo (JP)

(73) Assignees: Fuji Jukogyo Kabushiki Kaisha, Tokyo (JP); Kubota Iron Works Co., Ltd., Hiroshima (JP)

( * ) Notice: Subject to any disclaimer, the term of this patent is extended or adjusted under 35 U.S.C. 154(b) by 0 days.

(21) Appl. No.: 10/601,270

(22) Filed: Jun. 20, 2003

(65) Prior Publication Data

US 2004/0083595 A1 May 6, 2004

Related U.S. Application Data

(62) Division of application No. 09/602,672, filed on Jun. 26, 2000, now Pat. No. 6,615,476.

(30) Foreign Application Priority Data

Jun. 30, 1999 (JP) .......................................... 11-185542

(51) Int. Cl.[7] ................................................ B23P 17/00

(52) U.S. Cl. ....................... 29/525.01; 29/515; 29/517; 403/279; 403/282

(58) Field of Search ............................ 29/525.01, 2.15, 29/505, 511, 515, 517, 520, 888.09, 897, 890.1; 403/274, 278, 279, 282; 285/405, 18; 420/121, 126, 127

(56) References Cited

U.S. PATENT DOCUMENTS 2,852,843 A * 9/1958 Banta et al. .................. 29/517
3,120,206 A * 2/1964 Sporck .......................... 72/81
3,367,020 A * 2/1968 Watson ........................ 228/161
3,699,636 A * 10/1972 Walker ........................ 29/432
4,056,291 A * 11/1977 Kraft et al. ................. 384/537
5,279,688 A * 1/1994 Isokawa et al. ............. 148/330
5,619,879 A * 4/1997 Friese .......................... 72/82

FOREIGN PATENT DOCUMENTS

JP 58100926 6/1983
JP 10156450 6/1998

* cited by examiner

*Primary Examiner*—David P. Bryant
*Assistant Examiner*—Stephen Kenny
(74) *Attorney, Agent, or Firm*—Martin A. Farber

(57) ABSTRACT

A method is required in which a plate-like flange member may be firmly secured at the front end of a hollow shaft member through a plastic working treatment by virtue of caulking combination, so as to manufacture a hollow shaft having a flange at one end thereof. In detail, the method comprises preparing a plate-like flange member A having an axial projection 13 including a constricted portion 13*a* on one side thereof; preparing a hollow shaft member B having an elongate internal space arranged in the axial direction thereof; engaging the axial projection 13 of the plate-like flange member A into a front end portion of the hollow shaft member B and at the same time inserting a mandrel 15 into the hollow shaft member B; pressing the hollow shaft member B in its axial direction towards the plate-like flange member A while performing a shear spinning treatment on the outer periphery surface of the hollow shaft member B so as to reduce the size of the hollow shaft member B in its radial direction; engaging the front portion of the hollow shaft member B with the constricted portion 13*a* of the axial projection 13 of the plate-like flange member A by virtue of caulking combination.

2 Claims, 10 Drawing Sheets

METHOD OF MANUFACTURING A HOLLOW SHAFT HAVING A FLANGE AT ONE END THEREOF

This application is a divisional application of our application Ser. No. 09/602,672 filed Jun. 26, 2000 now U.S. Pat. No. 6,615,476, the entire disclosure of which is considered as being part of the disclosure of this continuation application and is hereby incorporated by reference herein in its entirety.

BACKGROUND OF THE INVENTION

The present invention relates to a method of manufacturing a hollow shaft having a flange at one end thereof.

A hollow shaft to which the present invention relates is often used as an output shaft in a planetary gearing device of a speed change gear box in a motor vehicle. Such kind of hollow shaft is usually manufactured by engaging a flange member with a hollow shaft member through plastic working treatment by virtue of caulking combination.

Japanese Unexamined Patent Publication No. 58-100926 has disclosed a shaft manufacturing method in which a ring-like member is integrally formed at one end of a hot low shaft through plastic working treatment. In detail, an end portion of a cylindrical work piece engaged with a ring-like member is bent backwardly, so that the cylindrical work piece and the ring-like member may be firmly fixed together by virtue of caulking combination.

Further, Japanese Unexamined Patent Publication No. 10-156450 has disclosed another shaft manufacturing method in which a ring-like member is engaged at one end of a hollow work piece, an outer periphery portion of the hollow work piece protruding beyond the ring-like member is bent towards the ring-like member, so that the ring-like member and the hollow work piece may be firmly fixed together by virtue of caulking combination.

However, each of the above manufacturing methods requires that part of a hollow work piece protruding beyond a ring-like member (engaged with the hollow work piece) is subjected to a plastic working treatment so that the ring-like member may be pressed in the axial direction so as to be fixed in the hollow work piece. Although each of these methods is proved to be effective in securing a ring-like member (having a predetermined thickness in its axial direction) on to a hollow shaft with a predetermined strength, none of them has been provided to be effective in firmly securing a plate-like member onto a hollow shaft by virtue of caulking combination.

SUMMARY OF THE INVENTION

The present invention has been accomplished in view of the above problem, its object is to provide a method in which a plate-like flange member may be firmly secured at the front end of a hollow shaft-member through a plastic working treatment by virtue of caulking combination, so as to manufacture a hollow shaft having a flange at one end thereof.

According to the present invention, there is provided a method of manufacturing a hollow shaft having a flange at one end thereof, said method comprising the steps of: preparing a plate-like flange member having an axial projection including a constricted portion on one side thereof; preparing a hollow shaft member having an elongate internal space arranged in the axial direction thereof; engaging the axial projection of the plate-like flange member into a front end portion of the hollow shaft member and at the same time inserting a mandrel into the hollow shaft member; pressing the hollow shaft member in its axial direction towards the plate-like flange member while performing a shear spinning treatment on the outer periphery surface of the hollow shaft member so as to reduce the size of the hollow shaft member in its radial direction; engaging the front portion of the hollow shaft member with the constricted portion of the axial projection of the plate-like flange member by virtue of caulking combination.

In one aspect of the present invention, a front end portion of the axial projection of the plate-like flange member has a turning-prevention structure such as a serration structure formed on its outer periphery surface.

In another aspect of the present invention, the plate-like flange member and the hollow shaft member, which are to be engaged with each other by virtue of caulking combination, are made of a material containing 0.2–0.6 wt % of C, 0.01–0.1 wt % of Si, 0.05–0.5 wt % of Mn, 0.001–0.01 wt % of B, 0.01–0.1 wt % of Ti or Nb, with the balance being Fe, and are subjected to a heating treatment upon being combined into an integral body.

With the use of the present invention, when the axial projection of the plate-like flange member is engaged into the front portion of the hollow shaft member by virtue of caulking combination, the front portion of the hollow shaft member may be partially combined into the constricted portion of the axial projection, thereby effecting an extremely strong caulking combination of the plate-like shaft member with the hollow shaft member.

Further, if a front end portion of the axial project ion of the plate-like flange member has a turning-prevention structure such as a serration structure formed on its outer periphery surface, it is sure to obtain a further strong combination of the two members.

Moreover, since the plate-like flange member and the hollow shaft member are made of a material containing only a reduced amount of Si and Mn, it is allowed to ensure an improved ductility even if they contain a relatively large amount of C, thereby allowing a desired plastic working treatment on these members without causing any cracks.

The above objects and features of the present invention will become better understood from the following description with reference to the accompanying drawings.

DETAILED DESCRIPTION OF THE PREFERRED EMBODIMENTS

One embodiment of the present invention will be described in the following with reference to the accompanying drawings.

Figure 1:
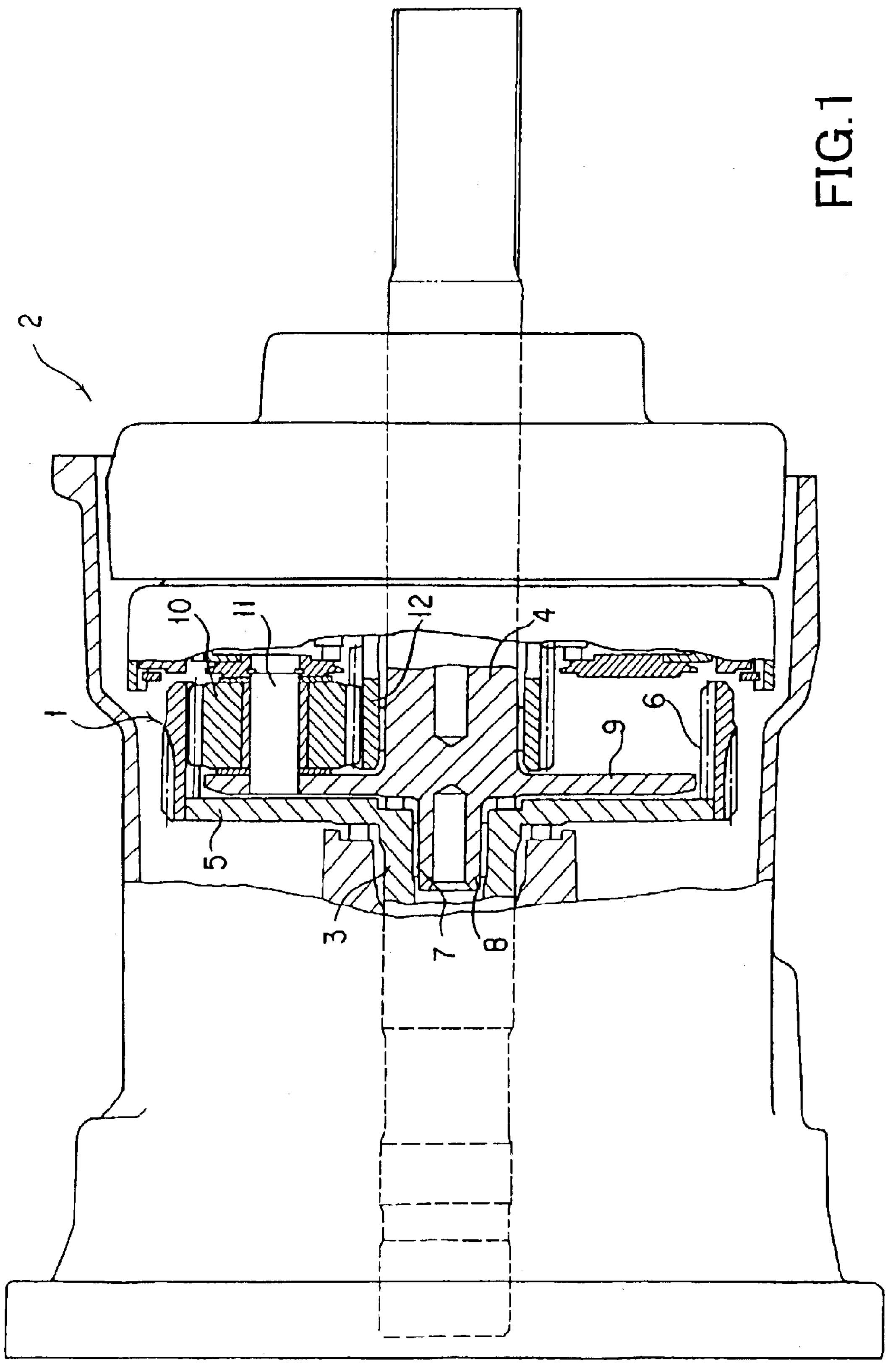
FIG. 1 is a partially sectional side view illustrating an example of a planetary gearing device.

FIG. 1 is a partially sectional view indicating a planetary gearing device I including a hollow shaft manufactured in a method of the present invention. The planetary gearing device 1 is usually provided within an automatic speed change gear box 2 of a motor vehicle. The automatic speed change gear box 2 has an input shaft 3 serving as an example of a hollow shaft having a flange at one end thereof. The rotation of the input shaft 3 is transmitted through the planetary gearing device 1 to an output shaft 4 serving as another example of a hollow shaft having a flange at one end thereof.

As shown in FIG. 1, a flange 5 is formed at one end (output side) of the input shaft (hollow shaft) 3. An internal gear 6 is provided around the outer periphery surface of the flange 5. On the other hand the output shaft 4 (hollow shaft) is coaxially connected with the output side of the input shaft 3. A support shaft 8 is protrudingly provided on the output side of the input shaft 3 by means of a bearing 7 so that support shaft 8 is freely rotatable. Further, a flange 9 serving as a carrier for planetary gears is provided in the vicinity of the support shaft 8. Here, reference numeral 10 is used to represent a planetary gear supported by a carrier shaft 11 fixed on the flange 9. The planetary gear 10 is engaged with the internal gear 6 and a sun gear 12 supported on the output shaft 4.

A method of manufacturing a hollow shaft having a flange at one end thereof (such as the input shaft 3 and the output shaft 4 used in the planetary gearing device 1) will be described in the following, with reference to FIGS. 2 to 6.

Figure 2:
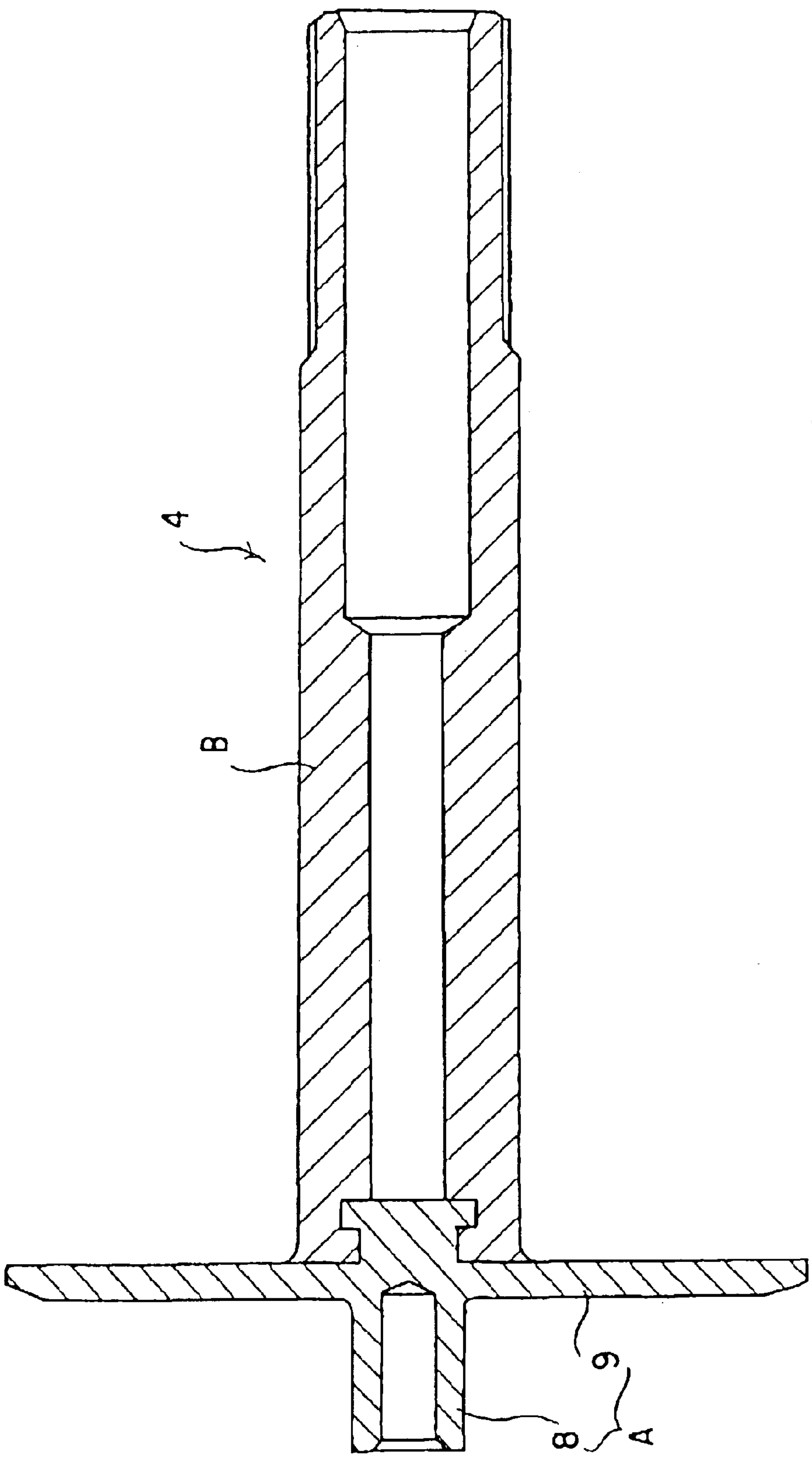
FIG. 2 is a longitudinally sectional view indicating a hollow shaft (output shaft) made according to the present invention for use in the planetary gearing device of FIG. 1.
Figure 3:
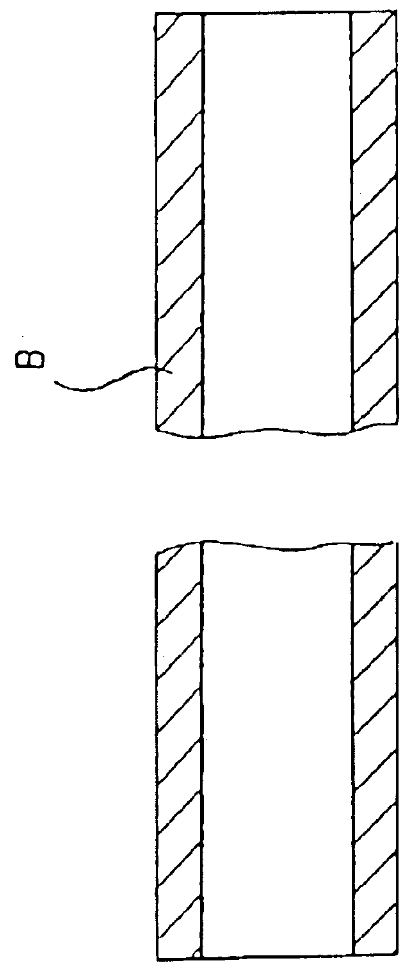
FIG. 3A is a sectional view indicating a plate-like flange member forming a part of a hollow shaft made according to the present invention.
FIG. 3B is a sectional view indicating a hollow shaft member forming a part of a hollow shaft made according to the present invention.
Figure 3:
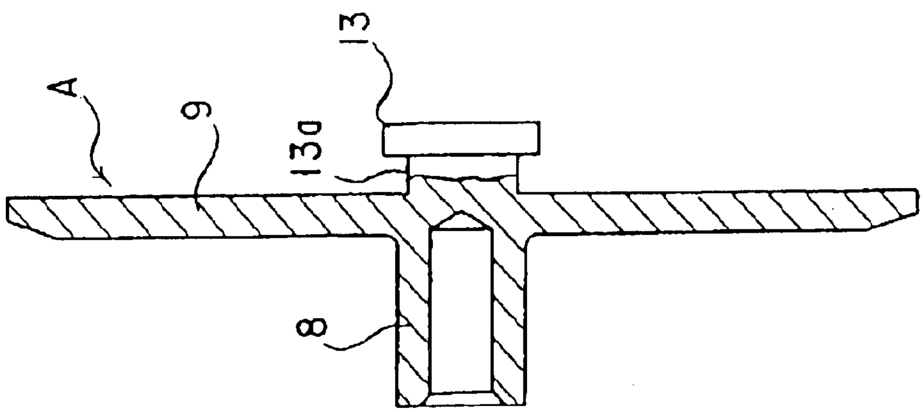

FIG. 2 is a longitudinally sectional view indicating the output shaft 4 manufactured in the method of the present invention. As shown in FIG. 2, the output shaft 4 has a plate-like flange member A (including a support shaft 8 and a flange 9) and a hollow shaft member B. At first, the plate-like flange member A and the hollow shaft member B are formed separately in different processes, and then combined together by shear spinning treatment so as to form an integral body.

FIG. 3A is a partially sectional view indicating the plate-like flange member A. As shown in FIG. 3A, the plate-like flange member A has the support shaft 8 formed on one side of the flange 9, an axial projection 13 formed on the other side of the flange 9. The formation of the support shaft 8 and the axial projection 13 may be accomplished by a forging treatment such as by precision pressing treatment. Further, the axial projection 13 has a constricted portion 13*a* formed by virtue of machining (cutting) treatment.

FIG. 3B is a longitudinally sectional view indicating a hollow shaft member B. In detail, the hollow shaft member B is formed by a steel pipe having an internal diameter capable of engaging around the axial projection 13 of the plate-like flange member A.

Figure 4:
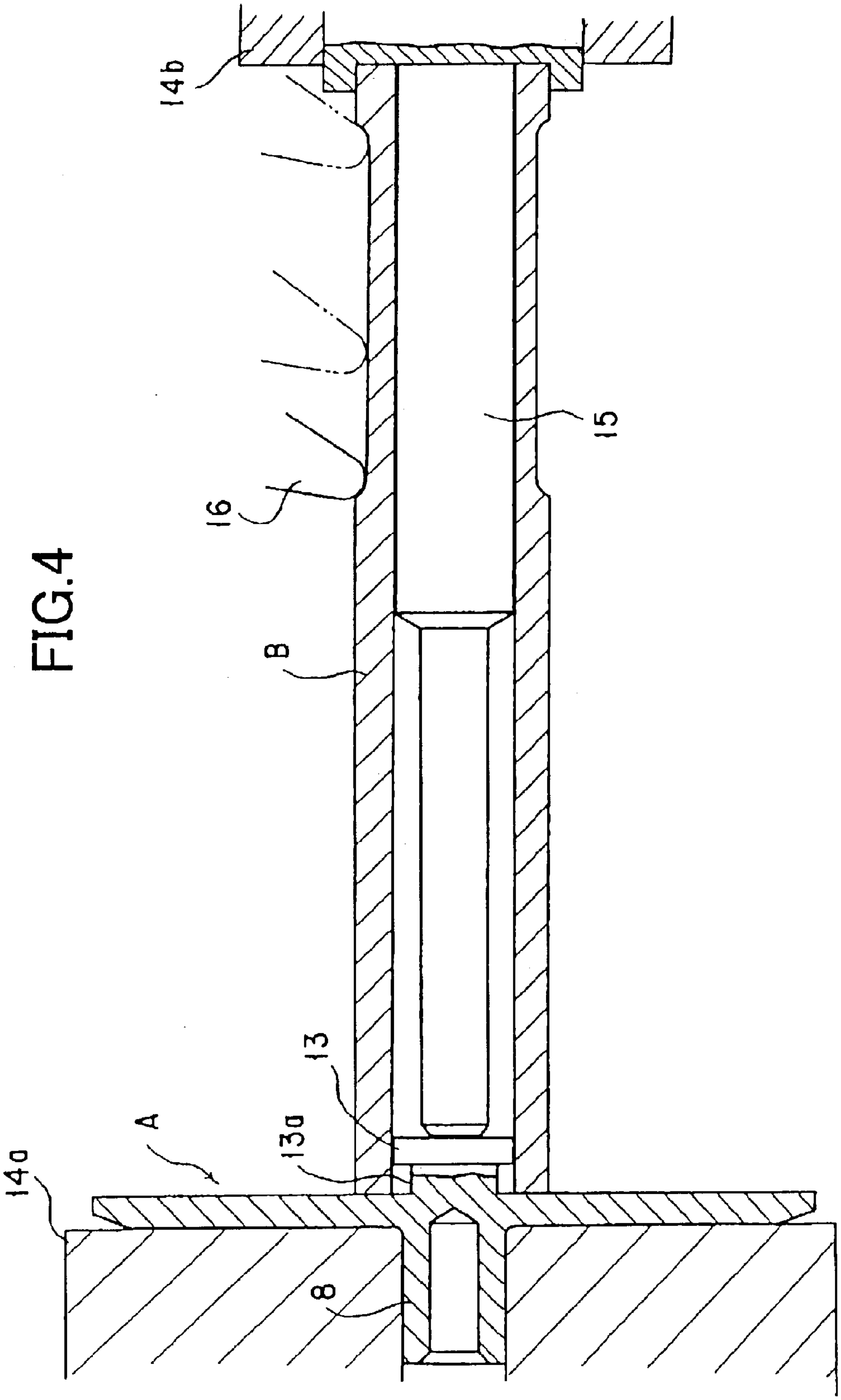
FIG. 4 is an explanatory view indicating a process for combining together the hollow shaft member and the plate-like flange member.

FIG. 4 is a longitudinally sectional view indicating a process in which the plate-like member A is combined with the hollow shaft member B. As shown in FIG. 4, the plate-like member A is at first clamped in a first clamp apparatus 14*a* with the axial projection 13 positioned on the outside of the clamp apparatus 14*a*. Then, the hot low shaft member B is engaged around the axial projection 13 of the plate-like flange member A. meanwhile, a mandrel 15 is inserted into the hollow shaft member B, so as to clamp the end portions of both the hollow shaft member B and the mandrel 15 on a second clamp apparatus 14*b* which is located opposite to the first clamp apparatus 14*a*. Here, the front portion of the mandrel 15 has a diameter smaller than that of the axial projection 13 of the plate-like flange member A.

Figure 5:
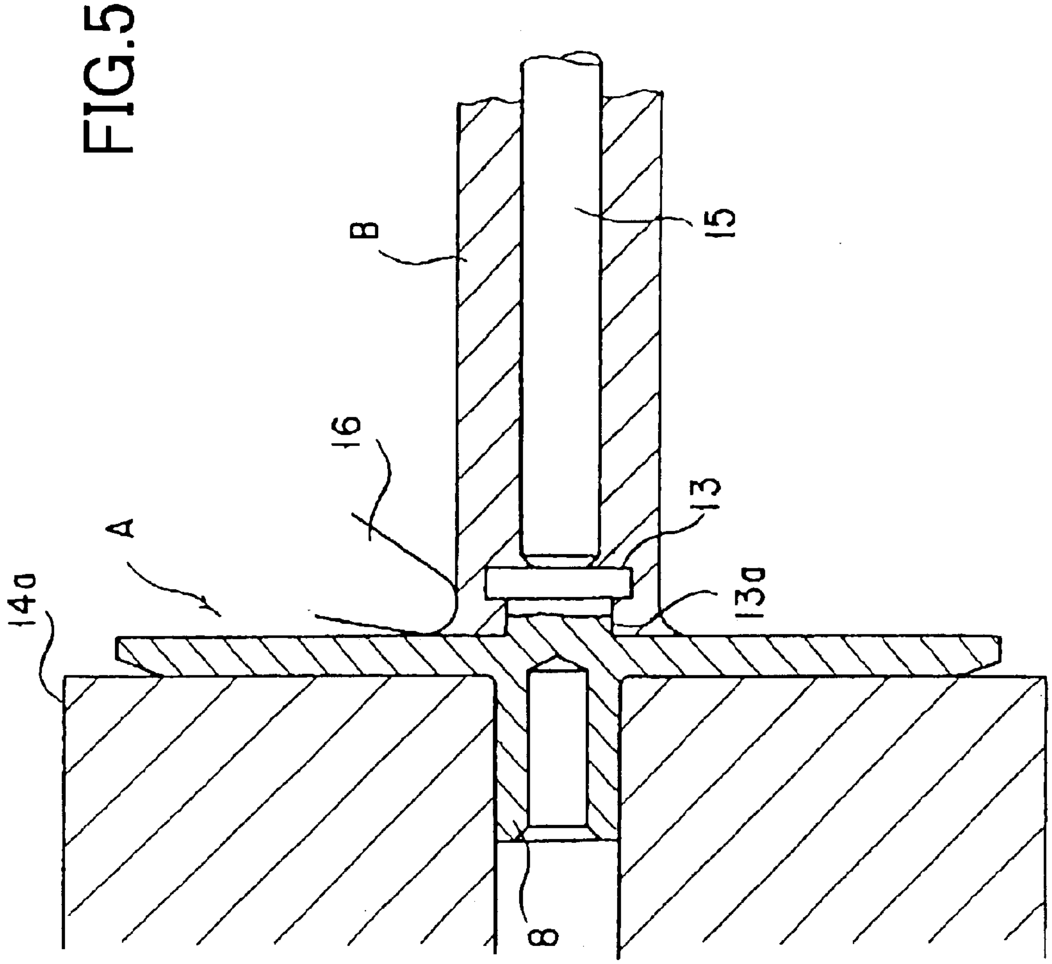
FIG. 5 is an explanatory view indicating a process for combining together the hollow shaft member and the plate-like flange member.

Subsequently, a spinning roll 16 is used to perform a shear spinning treatment on the hollow shaft member B from its rear end to its front end (from the right to the left in the drawing). As a result, the hollow shaft member B will be deformed and thus reduced in its external diameter along the shape of the mandrel 15, as shown in FIG. 5. In this way, the front end of the hollow shaft member B may be plastically deformed to engage into the constricted portion 13*a* of the axial projection 13 of the plate-like flange member A. Meanwhile, the axial projection 13 of the plate-like flange member A is also plastically deformed so as to enter the internal space of the hollow shaft member B, thereby completing a desired connection of the plate-like flange member A with the hollow shaft member B by means of caulking combination, followed by a predetermined machining treatment and a predetermined heating treatment.

Figure 6:
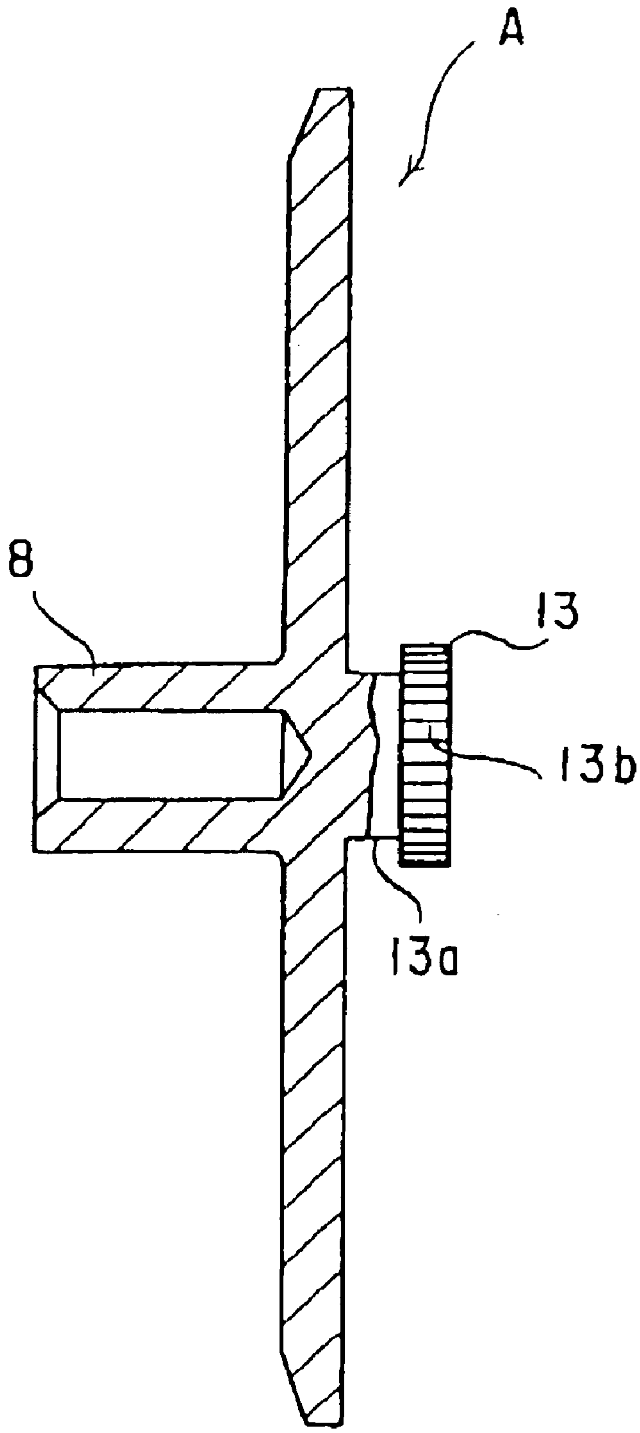
FIG. 6 is a partially sectional view indicating another example of a plate-like flange member.

On the other hand, as shown in FIG. 6, the axial projection 13 of the plate-like flange member A is also allowed to have a serration structure 13*b* formed around the outer periphery surface of the front portion of t the axial projection 13. In this manner, it is sure to obtain a stronger combination of the plate-like flange member A with the hollow shaft member B, so as to prevent an undesired rotation of the plate-like flange member A.

In the above process, the second clamp apparatus 14*b* is caused to press the hollow shaft member B so that the second clamp apparatus 14*b* itself moves towards the first clamp 14*a*, with the moving amount corresponding to a plastic deforming amount of the hollow shaft member B. At this time, the thickness of the hollow shaft member B will change slightly corresponding to an actual pressing force and an actually moved amount of the second clamp apparatus 14*b*.

Figure 7:
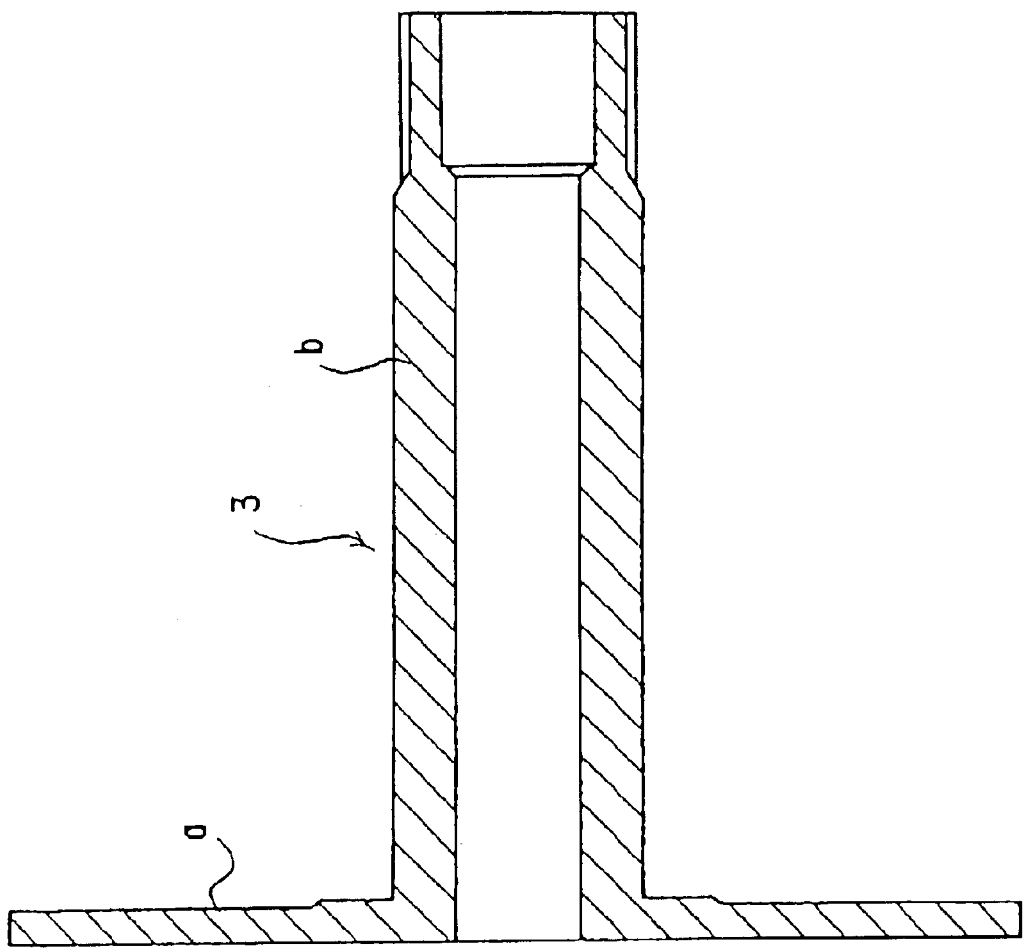
FIG. 7 is a sectional view indicating an input hollow shaft integrally formed with a flange at one end thereof.

A method of manufacturing the input shaft 3 shown in FIG. 7 will be described in the following with reference to FIGS. 8 to 10. As shown in FIG. 7, the input shaft 3 includes a flange portion a and a hollow shaft portion b integrally formed with the flange portion a. The flange portion a of the input shaft 3 is fixed with the internal gear 6, in a manner shown in FIG. 1.

Figure 8:
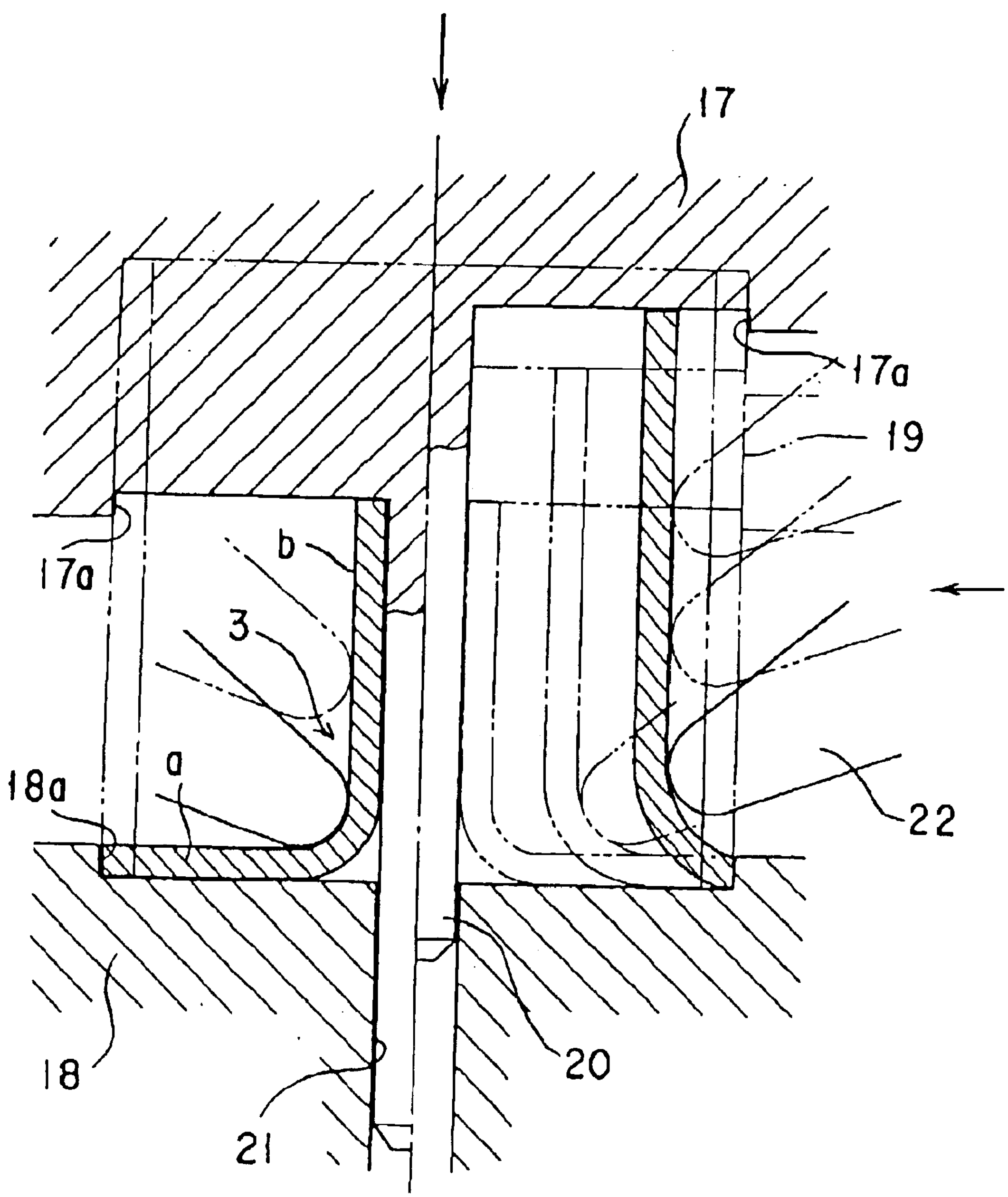
FIG. 8 is an explanatory view indicating a process of performing a plastic working treatment for obtaining an input hollow shaft integrally formed with a flange at one end thereof.

FIG. 8 is an explanatory view indicating a condition in which a steel pipe section 19 having a predetermined diameter is clamped at both ends thereof by a movable die 17 and a fixed die 18 (which are arranged facing each other).

In detail, the movable die 17 has a shoulder 17_a_ and the fixed die 18 has a shoulder 18_a_, so that the outer surface of the steel pipe section 19 may be engaged by the shoulders 17_a_ and 18_a_. In more detail, one of the dies, such as the movable die 17 is provided with a mandrel 20 passing through the center thereof. In fact, the mandrel 20 has an outer diameter which is exactly equal to an inner diameter of the hollow portion of the input shaft 3. The fixed die 18 is formed with an internal hole 21 engageable by the mandrel 20. In this way, the movable die 17 may be moved by an NC-controlled pressing force so that the die 17 can move towards the fixed die 18.

After the steel pipe section 19 has been clamped between the movable die 17 and the fixed die 18, a spinning roll 22 is employed to carry out a shear spinning treatment on the outer surface of the steel pipe section 19 from one end thereof along its entire length, so that the steel pipe section 19 is deformed and thus reduced in its diameter, while the other end of the steel pipe section 19 is bent outwardly in its radial direction so as to, be enlarged at this end. At this moment, effected by an NC-control led pressing force and in accordance with a predetermined moving amount, the movable die, 17 is caused to move towards the fixed die 18, thereby pressing one end of the steel pipe section 19 so as to promote the above described deformation of the pipe section.

In this way, an intermediate product of a desired input shaft 3 can be formed which includes a flange portion a having an outer diameter equal to the inner diameter of the shoulder portion 18_a_ of the fixed die 18, also includes a hollow shaft portion b having an inner diameter equal to the outer diameter of the mandrel 20. Subsequently, a predetermined machining treatment is performed. Afterwards, an internal gear 6 is attached on to the outer periphery surface of the flange portion a by virtue of supercurrent discharge combination, followed by a predetermined heating treatment.

In the above manufacturing process for forming the intermediate product of a desired input shaft 3, a thickness of the flange portion a and a thickness of the hollow shaft portion b may be controlled in view of the length and thickness of the steel pipe section 19 and in accordance with a pressing force and a moving amount of the movable die 17.

Figure 9:
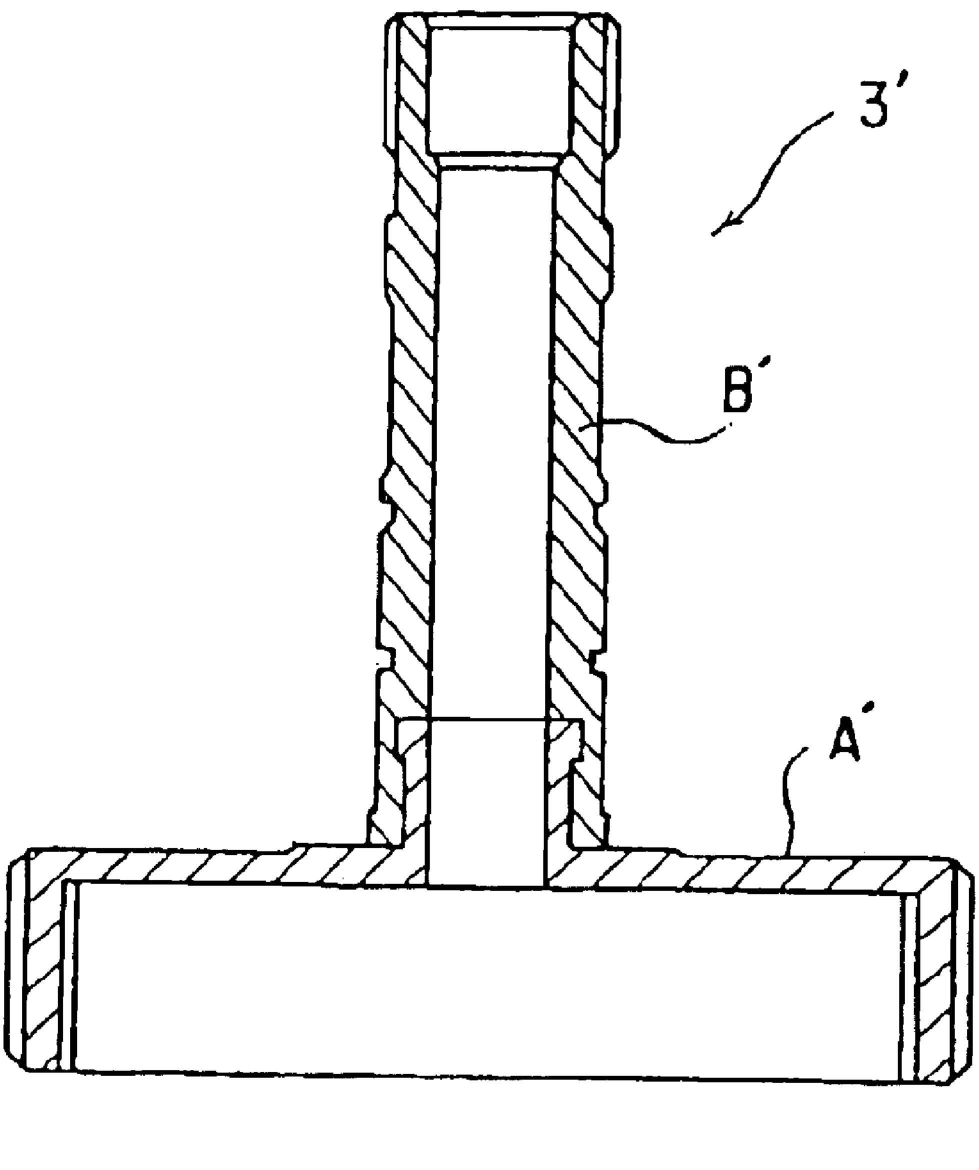
FIG. 9 is a sectional view indicating an input hollow shaft formed by a hollow shaft member and a plate-like flange member (including an internal gear formed within the flange member) manufactured in a method according to the present invention.
Figure 10:
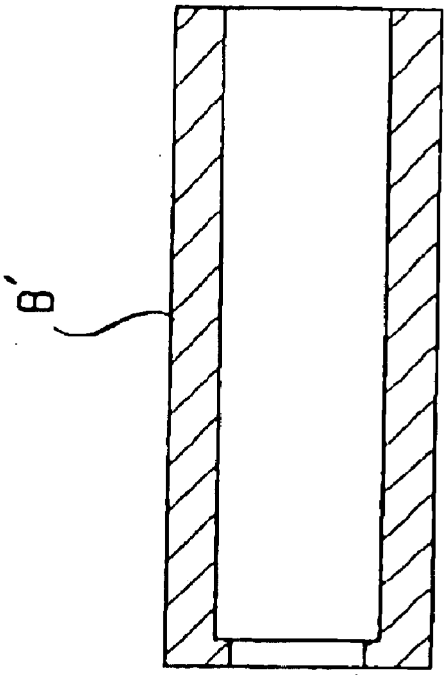
FIG. 10A is a sectional view indicating a plate-like flange member containing an internal gear formed within the flange member.
FIG. 10B is a sectional view indicating a hollow shaft member.
Figure 10:
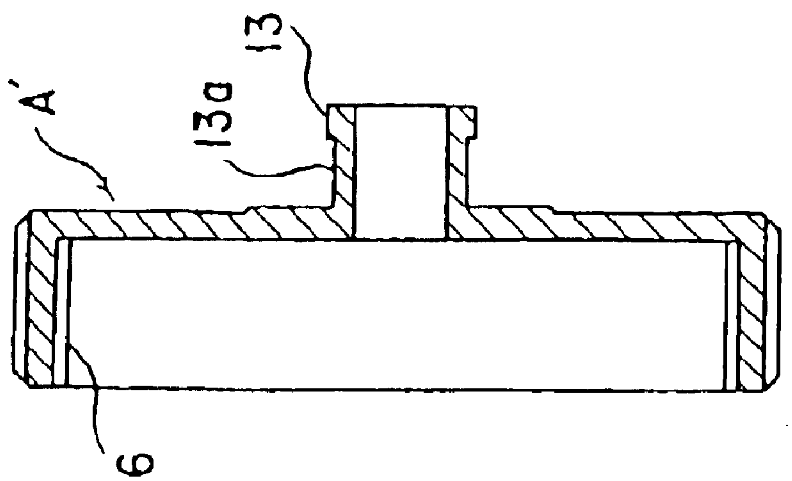

FIG. 9 is a sectional view indicating, as another embodiment of the present invention, a modified input shaft 3' having a plate-like flange member A' (including an integrally formed internal gear 6) and a hollow shaft member B'. In fact, the modified input shaft 3' may be manufactured in the same method for manufacturing the above output shaft 4.

Namely, as shown in FIG. 10A, the plate-like flange member A' may be prepared by machining treatment on a steel material, with the internal gear 6 integrally formed within the internal wall of the flange member. At this time, an axial projection 13 having a constricted portion 13_a_ is formed at the center of the plate-like flange member A'. The axial projection 13 of the plate-like flange member A' is then engaged into the frond end (having a smaller internal diameter) of the hollow shaft member B'. Afterwards, in the same method for manufacturing the output shaft 4, a shear spinning treatment is carried out on the outer periphery surface of the hollow shaft member B', so that the hollow shaft member B' is deformed and thus reduced in its outer diameter. In this way, the axial projection 13 of the plate-like flange member A' may be combined with the hollow shaft member B' through a plastic working treatment by virtue of a caulking combination.

However, in any of the above embodiments, it is also possible that each of the hollow shafts 3, 3' may be produced without forming the support shaft 8 on the plate-like flange member A or A'. Further, each of the plate-like flange members A, A' and the flange portion a should not be limited to a plate-like shape, but is allowed to be formed with ribs or is entirely formed into a tray-like member.

When using the manufacturing methods described in the above embodiments, various materials forming different parts of the above hollow shafts are required to have a sufficient ductility (without being broken or forming any cracks) even under a condition in which they are subjected to a highly severe plastic working treatment. Further, various materials forming different parts of the above hollow shafts are required to have sufficient strength and hardness after a predetermined heating treatment.

In addition, the inventors of the present invention have found some useful materials which can be suitably used to form different parts of the above hollow shafts. The newly found materials, when in use, can reasonably reduce an amount of ferrite-enhancing elements such as Si and Mn contained therein, so as to reduce a deformation resistance during plastic working treatment. Further, the newly found materials are found to be capable of ensuring a desired hardenability.

The composition of a test steel used in the method of the present invention and the composition of SCr420 (chrome steel) used in a prior art are shown in Table 1.

TABLE 1

| | Chemical Composition % | | | | | | | |
|---|---|---|---|---|---|---|---|---|
| Element | C | Si | Mn | P | S | Cr | B | Ti or Nb |
| Test Steel | 0.20 | 0.08 | 0.38 | 0.02 | 0.02 | — | 0.002 | 0.05 |
| SCr420 | 0.20 | 0.2 | 0.80 | 0.02 | 0.02 | 1.10 | — | — |

It has been found that when the above test steel was used to form the plate-like flange member A shown in FIG. 3A and the hollow shaft member B shown in FIG. 3B, and when a shear spinning treatment was conducted on them, there were no cracks occurring thereon, thereby exhibiting a sufficient ductility. Then, upon a machining treatment and a high frequency hardening treatment, a hollow shaft having a flange at one end thereof was thus obtained which had a hardness of HcR 55 to 65, thus satisfying a predetermined standard.

The ranges of various components contained in the steel materials suitable for use in the present invention may be concluded as follows. Namely, they are allowed to contain 0.2–0.6 wt % of C, 0.01–0.1 wt % of Si, 0.05–0.5 wt % of Mn, 0.001–0.01 wt % of B, 0.01–0.1 wt % of Ti or Nb, trace quantity of P and S, with the balance being Fe.

As indicated in the above, an upper limit for the content of C contained in the steel materials used in the present invention is 0.6%. Under such a condition, if Si and Mn are controlled within their allowable ranges 0.01–0.1% and 0.05–0.5%, it is allowed to ensure a high ductility for the matrix of the steel materials, making it possible for the steel materials to contain C in a content as high as 0.6% (such kind of C content was not allowable in a prior art since a steel material containing C content of 0.6% in a conventional material was not allowed to receive a plastic working treatment).

On the other hand, the ductility of a steel material will be improved still further if it does not contain Cr. Further, when C content is 0.2 to 0.35, it is allowed to perform a more complex plastic working treatment on a steel material. In addition, if a trace quantity of B is added, it is possible to remarkably improve the hardenability (heating treatment) of a steel material without hamperring its plastic workability.

As may be understood from the above description, with the use of the present invention, it is allowed to obtain at least the following advantages.

Namely, a plate-like flange member may be firmly attached to the front end of a hollow shaft member through a plastic working treatment by virtue of caulking combination. In this way, since the formation of the outer periphery surface and the internal surface of a hollow shaft member may be generally completed by virtue of a plastic working treatment, it is allowed to reduce operation steps involved in machining treatment and welding treatment which are usually carried out after the combination of the plate-like flange member with the hollow shaft member.

Further, since the steel materials used in the present invention can stand a complex plastic working treatment, it is sure to obtain a desired strength and a desired hardness upon a heating treatment such as a quenching (hardening) treatment.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A method of manufacturing a hollow shaft (b) with a flange (a) at one end thereof, comprising the steps of preparing a movable die (17) with an upper recess (17*a*) on an inside surface thereof and a mandrel (20) at a center position thereof;

placing a fixed die (18) under said movable die (17) with a lower recess (18*a*) with a same inside diameter of said upper recess (17*a*) in said inside surface thereof;

inserting a steel pipe (19) between said movable die (17) and said fixed die (18);

clamping said steel pipe (19) in a vertical direction by said movable die (17) and said fixed die (18);

engaging said mandrel (20) into said steel pipe (19); and pressing said steel pipe (19) while performing a shear spinning treatment on an outer peripheral surface of said steel pipe (19) so as to deform to only reduce an outside diameter thereof until touching thoroughly with an outside surface of said mandrel (20) without changing a thickness of said steel pipe (19) and to integrally form said flange (a), wherein said hollow shaft (b) and said flange (a) are composed of 0.2–0.6 wt % of C, 0.01–0.1 wt % of Si, 0.05–0.5 wt % of Mn, 0.001–0.01 wt % of B, 0.01–0.1 wt % of Ti or Nb, with the balance being Fa, and are subjected to a heat treatment upon finished forming, so as to ensure an improved ductility and thus an improved plastic workability.

2. A method of manufacturing a hollow shaft (b) with a flange (a) at one end thereof, comprising the steps of:

preparing a movable die (17) with an upper recess (17*a*) on an inside surface thereof and a mandrel (20) at a center position thereof;

placing a fixed die (18) under said movable die (17) with a lower recess (18*a*) on an inside surface thereof, the mandrel extending from the upper recess toward the lower recess, the upper recess having a shoulder encircling an axis of the mandrel with a diameter larger than a diameter of the mandrel, the lower recess having a shoulder encircling the axis of the mandrel with a diameter equal to the diameter of the shoulder of the upper recess for receiving a pipe to be held by the shoulders of the respective recesses;

inserting a steel pipe (19) between said movable die (17) and said fixed die (18), said inserting a step including a step of placing the mandrel within the pipe;

clamping said steel pipe (19) in a vertical direction by displacing said movable die (17) toward said fixed die (18), an inner diameter of said pipe being larger than an outer diameter of said mandrel; and pressing the steel pipe (19) while performing a shear spinning treatment on an outer peripheral surface of said steel pipe (19) so as to reduce an outside diameter of a portion of the pipe adjacent said movable die to form said shaft, and to integrally form said flange (a) on a portion of the pipe contiguous said fixed die;

wherein said pressing steps are accomplished by moving said movable die toward said fixed die, said shear spinning treatment is accomplished by applying a spinning roll to an outer surface of the pipe and;

wherein said hollow shaft (b) and said flange (a) are composed of 0.2–0.6 wt % of C, 0.01–0.1 wt % of Si, 0.05–0.5 wt % of Mn, 0.001–0.01 wt % of B, 0.01–0.1 wt % of Ti or Nb, with the balance being Fe, and are subjected to a heat treatment upon being combined into an integral body, so as to ensure an improved ductility and thus an improved plastic workability.

* * * * *